(12) United States Patent
Garrido Escudero

(10) Patent No.: US 8,696,936 B2
(45) Date of Patent: Apr. 15, 2014

(54) SYSTEM FOR CONTROLLED ON DEMAND IN SITU HYDROGEN GENERATION USING A RECYCLABLE LIQUID METAL REAGENT, AND METHOD USED IN THE SYSTEM

(76) Inventor: Amalio Garrido Escudero, Guadalupe (ES)

( * ) Notice: Subject to any disclaimer, the term of this patent is extended or adjusted under 35 U.S.C. 154(b) by 0 days.

(21) Appl. No.: 13/697,378

(22) PCT Filed: May 9, 2011

(86) PCT No.: PCT/EP2011/057399
§ 371 (c)(1),
(2), (4) Date: Nov. 12, 2012

(87) PCT Pub. No.: WO2011/141413
PCT Pub. Date: Nov. 17, 2011

(65) Prior Publication Data
US 2013/0064756 A1    Mar. 14, 2013

(30) Foreign Application Priority Data

May 13, 2010 (EP) .................................. 10162771

(51) Int. Cl.
*C01B 3/38* (2006.01)
*C01B 3/24* (2006.01)
*B01J 7/00* (2006.01)

(52) U.S. Cl.
USPC ................................ 252/373; 423/650; 48/61

(58) Field of Classification Search
USPC ........................................................ 252/373
See application file for complete search history.

(56) References Cited

U.S. PATENT DOCUMENTS 3,287,085 A    11/1966 Jenks
3,985,866 A    10/1976 Oda
4,156,635 A    5/1979 Cooper
(Continued)

FOREIGN PATENT DOCUMENTS

GB    1412327    11/1975

OTHER PUBLICATIONS

International Search Report; International Application No. PCT/EP2011/057399; Application Filing Date May 9, 2011; Mail date Aug. 11, 2011.

*Primary Examiner* — Melvin C Mayes
*Assistant Examiner* — Kenneth Vaden
(74) *Attorney, Agent, or Firm* — Cantor Colburn LLP

(57) ABSTRACT

A hydrogen generating system and a method of in situ hydrogen generation controlled on demand capable of reacting an aluminum-free metal reagent composed of at least one of alkali metals, alkaline earth metals, alkali metal alloys and blends including alkali metals, alkaline earth metal alloys and blends including alkaline earth metals and metal alloys including at least one alkali metal and at least one alkaline earth metal, with water to obtain hydrogen and a residual reaction product including metal hydroxide composed of at least one of alkali hydroxides and alkaline earth hydroxide; and separating hydrogen from the residual reaction product; liquefying the metal reagent by heating to obtain liquid metal reagent under vacuum conditions; injecting the liquid metal reagent into a reactor by metal reagent injecting means and simultaneously injecting, by water injection system, a stoichiometric amount of water with respect to the amount of the liquid metal reagent being injected into the reactor such that a controlled metal reagent/water ratio is maintained in the reactor; transferring hydrogen and the residual reaction product from the reactor to separation means; separating hydrogen from the residual reaction product; transferring separated hydrogen to hydrogen receiving means and transferring the residual reaction product to metal hydroxide receiving means, keeping the metal reagent injecting means water injection system, the reactor, the separating means and the hydrogen receiving means free of oxygen by selectively providing a vacuum in the system.

22 Claims, 5 Drawing Sheets

(56) References Cited

U.S. PATENT DOCUMENTS

| | | |
|---|---|---|
| 4,254,089 A | 3/1981 | Levy |
| 4,498,927 A | 2/1985 | Bowman |
| 4,980,136 A | 12/1990 | Brown |
| 4,988,486 A | 1/1991 | Harris |
| 5,867,978 A | 2/1999 | Klanchar |
| 6,245,309 B1 | 6/2001 | Etievant |
| 7,052,658 B2 | 5/2006 | Arthur |
| 2004/0065542 A1 | 4/2004 | Fairfull |
| 2005/0036941 A1 | 2/2005 | Bae |
| 2006/0011659 A1 | 1/2006 | Greiner-Perth |
| 2006/0117659 A1 | 6/2006 | McLean |
| 2009/0274595 A1 | 11/2009 | Fisher |

SYSTEM FOR CONTROLLED ON DEMAND IN SITU HYDROGEN GENERATION USING A RECYCLABLE LIQUID METAL REAGENT, AND METHOD USED IN THE SYSTEM

TECHNICAL FIELD OF THE INVENTION

The present invention lies within the technical field of chemical generation of hydrogen using alkali metals and alkaline earth metals, and recovery of alkali metals and alkaline earth metals from the corresponding hydroxides.

The invention is particularly useful in the generation of hydrogen in amounts that are controllably produced in response to varying demands thereof as, for example in vehicles with internal combustion engines, turbines or hydrogen cells such as vehicles for locomotion by land, air or water etc., and any other apparatus requiring on demand hydrogen generation for any purpose.

BACKGROUND OF THE INVENTION

Hydrogen can be used as non-polluting fuel in fuel cells, internal combustion engines or turbines, as well as in any other system where gaseous hydrogen is used as a fuel. Obviously, power generating systems using hydrogen as a fuel need the hydrogen to be produced by a generating process. Generally, hydrogen produced by such generating processes is stored as a gas or as a liquid in tanks from where it is conveyed to the power generating systems (e.g. US2006/011659A1). These systems are equivalent to conventional transporting systems used for non-renewable fossil fuels.

There is a large number of hydrogen generating systems, such like inter alia catalytic reforming of hydrocarbons like ethanol as disclosed in U.S. Pat. No. 6,245,309-B1 and U.S. Pat. No. 6,461,408-B2, electrolysis of water as disclosed in US2004/0065542A1, hydrides as disclosed in US2005/0036941A1 and US2009/0274595A1, metals and acids as disclosed in U.S. Pat. No. 4,988,486, metals and alkalis or aminoboranes as disclosed in U.S. Pat. No. 7,052,658-B2.

According to the US Department of Energy ("DOE"), energy density is "the ratio of available energy per pound" i.e. per unit of weight (cf. Solar Glossary: http://www1.eere.energy.gov/solar/solar_glossary.html#E). The following table lists the energy of some substances that are of interest as fuels:

TABLE I

| Substance | Energy density by mass) (MJ/kg) | Energy density by volume (MJ/L) |
|---|---|---|
| Liquid hydrogen | 143.00 | 10.10 |
| Hydrogen gas compressed at 700 bar | 143.00 | 5.60 |
| Hydrogen gas | 143.00 | 0.01 |
| Lithium borohydride | 65.20 | 43.40 |
| Methane (1.013 bar; 15° C.)* | 55.60 | 0.04 |
| Liquefied petroleum gas ("LPG") propene* | 19.60 | 25.30 |
| Liquefied petroleum gas ("LPG") butane* | 49.10 | 27.70 |
| Gasoline* | 46.40 | 34.20 |
| Diesel* | 46.20 | 37.30 |
| Lithium | 43.10 | 23.00 |
| Kerosene* | 42.80 | 33.00 |
| Magnesium | 24.70 | 43.00 |
| Calcium | 15.90 | 24.60 |
| Sodium | 13.30 | 12.80 |
| Biodiesel* | 42.20 | 33.00 |
| Lithium/sodium alloy (80/20) | 37.14 | 20.96 |
| Lithium/magnesium alloy (80/20) | 39.42 | 27.00 |
| Bioethanol* | 26.00 | 35.60 |
| Hard coal* | 32.50 | 72.40 |
| Soft coal* | 24.00 | 20.00 |
| Wood* | 18.00 | |
| Lithium-ion battery | 0.72 | 0.90 |
| Lead battery (automotive) | 0.14 | 0.36 |

Substances marked * generate carbon dioxide when used as a fuel.

As apparent, the density by volume of hydrogen gas is extremely low so that storage thereof in vehicle tanks or stationary tanks raises efficiency problems. Therefore, ways to generate hydrogen in situ on demand have been searched for.

To be competitive with conventional fuels or electric batteries, the energy density of hydrogen-based propelling systems must be equivalent or higher. Chemical hydrogen generation offers this possibility. In addition to the herein above mentioned patent documents, further such systems are disclosed in U.S. Pat. No. 4,156,635, U.S. Pat. No. 4,498,927, U.S. Pat. No. 4,980,136 and US2006/0117659A1, as well as in U.S. Pat. No. 3,985,866.

U.S. Pat. No. 3,985,866 discloses a method of producing high-pressure hydrogen gas by reacting a fuel comprising aluminum as main component and alkali or alkali earth metal or alloys thereof as minority component, with water, in a pressurized argon atmosphere. The high-pressure gas is aimed for use as driving energy for turbines to propel small-sized self-propelling submarine bodies. Alkali metal and/or alkaline earth metal is added to lower the melting point of aluminum, and to enable an initial exothermic reaction with water that provides sufficient hydroxide to react with aluminum oxide and avoid passivation of metal aluminum which would prevent the reaction of the aluminum with water. The reactions underlying this method are violent, take place at very high temperatures and pressures, and are thus difficult to control. This renders the method disclosed in US-3985866 rather unfeasible in industrial practice.

A number of known chemical hydrogen-generating systems use processes metal or non-metal hydrides as well as reactions of metals with acids or alkalis. The following table compares a number of fuels, including gasoline and diesel as non-renewable fuels, when used in vehicle engines:

TABLE II

| Fuel | Engine type | Consumption (L/100 km) | Consumption (kg/L) | Tank volume needed for 400 km (L) | Weight of the tank needed to store fuel for 400 km | Emissions (g CO$_2$/km) |
|---|---|---|---|---|---|---|
| Gasoline | Internal combustion | 8 | 5.84 | 32 | 23.36 | 170 |
| Diesel | Internal combustion | 6 | 5.1 | 24 | 20.4 | 110 |
| Liquid hydrogen | Internal combustion | 46 | 3.26 | 184 | 13.04 | 0 |
| Liquid hydrogen | Fuel cell | 23.93 | 1.7 | 95.72 | 6.8 | 0 |
| Lithium | Internal combustion | 21.34 | 11.31 | 85.36 | 45.24 | 0 |
| Lithium | Fuel cell | 11.11 | 5.89 | 44.44 | 23.56 | 0 |

TABLE II-continued

| Fuel | Engine type | Consumption (L/100 km) | Consumption (kg/L) | Tank volume needed for 400 km (L) | Weight of the tank needed to store fuel for 400 km | Emissions (g CO$_2$/km) |
|---|---|---|---|---|---|---|
| Sodium | Internal combustion | 38.63 | 37.47 | 154.52 | 149.88 | 0 |
| Sodium | Fuel cell | 20.12 | 20.12 | 80.48 | 80.48 | 0 |

The majority of conventional hydrogen generating systems requires catalysts and/or ignition systems are expensive with regard to recycling the fuel or use highly toxic substances. Whilst a major proportion of these systems is susceptible of being installed in motor vehicles, they still are technically complex or involve technical, economical or environmental drawbacks, especially in respect of providing sufficient precision and sensitivity of generating a stream of hydrogen that may allow an immediate response to power demands as, for example, by direct injection thereof into an internal combustion motor or a turbine, and in respect of recycling fuel used. There was thus a need to develop a hydrogen generating system that would overcome these drawbacks.

BRIEF SUMMARY

The present invention is intended to overcome the afore mentioned drawbacks of prior art by providing a novel way of generating hydrogen by means of a reaction between a liquefied aluminum-free metal reagent selected from alkali metals, alkaline earth metals, alkali metal alloys or blends comprising alkali metals, alkaline earth metal alloys or blends comprising alkaline earth metals or a metal alloy or blend comprising at least one alkali metal and at least one alkaline earth metal, and water, as well as an improved way to of recycling such metals or alloys after hydrogen generation. To facilitate the conciseness of this specification and of the claims appended hereto, the alkali metal, alkaline earth metal and the alloys as defined above will also jointly be referred to as "metal reagent". The residue of the metal reagent produced after hydrogen generation will be referred to as "metal hydroxide". Particularly, the invention refers to a controlled on demand in situ hydrogen generating system using a recyclable liquid metal reagent, a method for generating hydrogen in situ on demand using the liquid metal reagent, as well as to a process and an apparatus and process for recovering the metal reagent from the metal hydroxide after hydrogen generation.

The hydrogen generating system for controlled on demand in situ hydrogen generation according to the invention comprises first storage means for storing a first reagent which is the aluminum-free metal reagent selected from alkali metals, alkaline earth metals, alkali metal alloys and blends comprising alkali metals, alkaline earth metal alloys and blends comprising alkaline earth metals, and metal alloys comprising at least one alkali metal and at least one alkaline earth metal, in a safe way and under proper preservation conditions in a substantially oxygen-free environment generated, for example, by a vacuum or inert gas atmosphere, and second storage means for storing a second reagent i.e. demineralized water, a reactor in which the reagents are made to react to generate gaseous hydrogen. The reactor is a homogeneous reactor i.e. a reactor in which the reagents are present in a single phase, and comprises reagent inlets and a reactor outlet, separating means connected to the reactor outlet for separating the gaseous hydrogen from a residual reaction product i.e. metal hydroxide selected from alkali metal hydroxides and alkaline earth metal hydroxides, alkali metal alloys, alkaline earth metal alloys and alloys comprising alkali metal and alkaline earth metal as produced in the reactor, and hydrogen receiving means connected to the first separating means for receiving gaseous hydrogen extracted from the first separating means. Especially suitable metal reagents are Li, Na, K and Mg, preferred suitable metal reagents are Na and Li, and a particularly preferred metal reagent is Na due that has a relatively low melting point and is abundant. An especially interesting alloy is 5/95 Li/Na alloy which has an energetic intensity that is higher than that of Na alone and a melting point (=89° C.) that is 10° C. lower than that of Na. Other useful alloys comprise, for example, potassium and sodium such as 56/44 Na/K alloy the melts at 6.8° C., or lithium and strontium such as 12/88 Li/Sr alloy that melts at 132° C.

In accordance with the invention, the hydrogen generating system comprises
metal reagent injecting means for controllably injecting a flow of liquid metal reagent heated above its melting point into the reactor;
a water injection system for injecting at all times a stoichiometric amount of, preferably cool and liquid, water with respect to the amount of the metal reagent being injected into the reactor such that a controlled metal reagent/water ratio is maintained in the reactor;
means for keeping the storage means, the metal reagent injecting means, the water injection system, the reactor, the separating means and the hydrogen receiving means free of oxygen, by providing a vacuum in the system.

The liquid metal reagent may be injected into a stream of demineralized water or the stream of demineralized water may be injected into a stream of liquid metal reagent in turbulent, laminar or segmented flow conditions. Election of the flow conditions will depend on:
  a. the metal/metal alloy used,
  b. the reactive interface active surface required to carry out the reaction under controlled conditions, and
  c. mass of liquid metal/metal alloy per volume unit.

The ratio "interface surface within both reagents (demineralized water and liquid metal/metal alloy/liquid metal)/mass per volume unit" enhances the level of control over the reaction and the safety and performance of the hydrogen generation process. This ratio can be set up by optimizing, among other parameters, the diameters of the injection pipes, reactor length, flow velocity, flow stream pressures and temperatures. Laminar flow conditions have the advantage that hydrogen generation is normally easier to control than under turbulent flow conditions.

In a preferred embodiment of the invention, the first storage means are connected to a first reactor inlet through a metal reagent feeding system that comprises at least one metal reagent injecting device for controllably injecting the flow of the metal reagent in a liquid state into the reactor by extrusion through a controlled dimension orifice extruder die head, a metal injecting pipe connecting the injection device with the first reactor inlet, reagent heating means for heating the metal reagent to a temperature above the metal reagent's melting point so as to bring the metal reagent into said liquid state before entering the reactor. The metal reagent feeding system further comprises vacuum generating means for selectively generating a vacuum in the first feeding system the storage means, the water injection system, the reactor, the separating means and the hydrogen receiving means free of oxygen to ensure proper storage conditions and process start-up. Flow control valve means for controlling the flow of the metal reagent into the reactor, and refrigerating means for maintaining the reactor at a working temperature are provided. The flow control valve means may be inserted in the metal injecting pipe and comprise a pressure control valve arranged between the reagent outlet and the first reactor inlet, and a check valve arranged between the pressure control valve and the first reactor inlet to avoid refluxes of reagents from the reactor.

In accordance with this preferred embodiment, the second storage means are connected to a second reactor inlet through a water feeding system comprising a water injection pipe connecting the second storage means to the second reactor inlet, water dosing means for dosing the water to be injected into the reactor and water injecting means connected to the second reactor inlet. The flow control valve means and the water dosing means are controlled by ratio control means such that the water dosing means at all times provide a stoichiometric amount of water with respect to the amount of the metal reagent being injected into the reactor such that a controlled metal reagent/water ratio is maintained in the reactor. The reactor is designed and dimensioned to retain the metal reagent and the water for a period of time sufficient as to ensure a complete reaction of metal reagent and water in accordance with the flow of metal reagent and water injected at all times, and that the reaction products extracted are only hydrogen and the residual reaction product.

As apparent, the invention relies on the per se known reaction schemes of alkali metals and alkaline earth metals with water as represented by the formulae

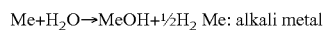
Me+H$_2$O→MeOH+½H$_2$  Me: alkali metal

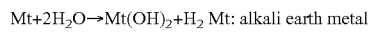
Mt+2H$_2$O→Mt(OH)$_2$+H$_2$  Mt: alkali earth metal

As known, these reactions are strongly exothermic and very quick inasmuch they take place almost immediately when the alkali metal or alkali earth metal contact water and hydrogen is released. The, present invention uses the quickness of the reaction. Whilst these reactions are per se violent when a solid metal reactant is brought in contact with the water, according to the present invention the metal reactant is in its liquid state so that it can be easily dosed so as to make it react with the water in a stoichiometric manner in an oxygen-free environment, such that a violent reaction with ambient oxygen is excluded. For example, a vacuum below 300 mm/Hg is normally sufficient to prevent hydrogen as generated to explode, as hydrogen generated in the reactor is already under pressure due to the generated hydrogen. Heat generated by this exothermic reaction can be used to heat the metal reagent that is to be injected into the reactor, for example by thermally connecting reactor refrigerating means with the first and/or second reagent heating means. The generated heat may also used for providing thermal energy to fuel cells or a combustion engine.

Thus, by means of the system of the present invention, hydrogen generation may be increased or decreased, or fully stopped, in accordance with the amount of hydrogen demanded at all times. The hydrogen receiving means may be, for example, a hydrogen tank from which hydrogen is delivered to a fuel cell or hydrogen combustion engine or hydrogen turbine and/or the hydrogen inlet of a fuel cell or hydrogen combustion engine or hydrogen turbine.

As the metal reagent is fluid, it may be easily injected into the reactor together with the corresponding stoichiometric amounts of demineralized water, in amounts at quickly variable rates whereby a variable flow of hydrogen adapted to varying hydrogen demands may be generated. Thus, the metal reagent feeding system and the water feeding system may be controlled to normally operate at hydrogen generation rates adapted to satisfy at all times the energy demand of, for example, an engine, and to increase hydrogen generation to fill a tank having a capacity at least large enough to provide hydrogen for restarting the engine and/or for provide supplementary hydrogen when extra amounts of hydrogen are momentarily required to satisfy increased energy needs of the engine. Also, the metal reagent feeding system and the water feeding system may be controlled to normally feed hydrogen to a tank at a substantially constant "baseline" hydrogen generation rate to fill a hydrogen tank from which hydrogen is normally withdrawn in accordance with the momentary needs of, for example, the engine, up to a certain maximum limit, and increase hydrogen generation to provide supplementary hydrogen directly to the engine when there are peaks of hydrogen consumption that are higher than said maximum limit, and/or when it is necessary to refill the hydrogen tank.

The melting points of alkali metals and alkaline earth metals and other features thereof are given in the following table:

| Metal | Atomic weight (u) | Melting point (° C.) | Boiling point (° C. at 760 mmHg) | Density (g · cm$^{-3}$) |
|---|---|---|---|---|
| Lithium | 6.041 | 180 | 1,342 | 0.53 |
| Sodium | 22.990 | 97 | 883 | 0.97 |
| Potassium | 39.098 | 63 | 759 | 0.89 |
| Rubidium | 85.468 | 39 | 688 | 1.53 |
| Cesium | 132.905 | 28 | 671 | 1.93 |
| Magnesium | 24.305 | 650 | 1,107 | 1,738 |
| Calcium | 40.078 | 839 | 1,484 | 1,55 |
| Strontium | 87.620 | 764 | 1,384 | 2.54 |
| Barium | 137.327 | 725 | 1,140 | 3.59 |

In an embodiment of the system, the metal reagent injecting device comprises a cylinder barrel, and a head chamber for housing metal reagent in a liquid or solid state, a reagent outlet connected to the metal reagent injecting pipe, a reagent inlet connected to the first storage means by means of a metal reagent feeding pipe, and a metal reagent feeding valve connected between the reagent inlet and the first storage means. In this embodiment, the metal reagent injecting device further comprise a vacuum port connected to the vacuum generating means, and a piston movable within the cylinder barrel towards a first position whereby metal reagent is sucked into the head chamber through the reagent inlet and towards a second position whereby the flow of metal reagent is expelled from the head chamber through the reagent outlet into the metal injecting pipe. A piston actuator is provided for controlling the movement of the piston between said first position and said second position and to exert controlled pressure on the liquid metal reagent present within the cylinder barrel. In this case, the vacuum generating means may comprise a vacuum system connected to the vacuum port through a vacuum pipe, and a vacuum valve inserted in the vacuum pipe. Also, the reagent heating means may comprise first reagent heating means arranged to heat at least the head chamber of the metal reagent injecting device, as well as second reagent heating means arranged at the metal injecting pipe.

In accordance with the invention, the separating means may comprise first separating means, such as a gas-liquid separator, connected to the reactor outlet and comprising an inlet connected to the reactor outlet for receiving a mixture of hydrogen and the residual reaction product as generated in the reactor, a first outlet connected to the hydrogen receiving means, and a second outlet connected to metal hydroxide receiving means provided to receive residual reaction product extracted from the first separating means. The first separating means may be a static separator with an inner chamber with inclined baffles arranged to provide a labyrinth path between inlet and the first outlet to allow light hydrogen gas to pass to the upper portion of the inner chamber, and to retain alkali metal hydroxide in the lower portion of the inner chamber. The first separating means may further comprise a suction port connected to the vacuum system, and a start-up vacuum valve interconnected between the suction port and the vacuum system. As the separated hydrogen present in the inner chamber is under pressure, a hydraulic level of metal hydroxide is to be maintained in the bottom portion of the inner chamber so as to prevent the separated hydrogen gas to escape when metal hydroxide is being withdrawn, The reactor outlet may be connected to a spraying nozzle to spray said mixture into the first separating means. The first separating means may further comprise a suction port connected to the vacuum system, and a start-up vacuum valve interconnected between the suction port and the vacuum system. Other gas/liquid separators may also be used.

The system may further comprise second separating means interconnected between the hydrogen receiving means and the first outlet of the first separating means, the second separating means being a demister comprising a gas-vapor inlet connected to the first outlet of the first separating means, a hydrogen outlet connected to the hydrogen receiving means, and a metal hydroxide outlet connected to the metal hydroxide receiving means. A hydrogen filtering device may be interconnected between the demister and the hydrogen receiving means.

In accordance with the invention, the system may further include a recovery system for recovering metal reagents selected from Li, Na, K, Mg and alloys thereof from the residual reaction product containing these elements or alloys. The recovery system then comprises a metal-hydroxide reducing reactor comprising a reaction chamber, a residue inlet for feeding residual reaction product comprising at least one metal hydroxide into the reaction chamber so as to bring the residual reaction product in contact with a reducing agent comprising ferrosilicon and calcium oxide, a reactor extraction outlet for selectively extracting moisture and vaporized metal reagent from the reaction chamber. A reducing agent inlet may be provided for feeding a mixture of finely divided ferrosilicon and calcium oxide into the reaction chamber.

Reactor heating means are provided for selectively heating the reaction chamber to a dehydrating temperature to extract moisture from the residual reaction product, to a calcination temperature to convert dehydrated metal hydroxide into metal oxide, and to a vaporization temperature that is higher than the boiling point of the metal reagent present in the residual reaction product so as to obtain the vaporized metal reagent.

A vacuum trap is interconnected in a vacuum conduct that connects the reactor extraction outlet and the vacuum generating means. The vacuum trap comprises a condensate outlet located at its bottom portion and connected to a condensate extraction valve and a venting outlet located at its top portion and connected to a venting valve. Further, a moisture extraction valve is interconnected in the vacuum conduct between the extraction outlet and the vacuum trap, and moisture cooling means are provided for cooling moisture present in the vacuum trap down to a moisture condensation temperature. An extraction conduct is connected to the reactor extraction outlet and to an metal reagent reservoir, and metal reagent cooling means are arranged at the extraction conduct for liquefying the vaporized alkali metal entering the extraction conduct by cooling it down to a temperature above the melting point of the metal reagent, so that liquid metal reagent is delivered into the metal reagent reservoir. The metal reagent reservoir may be provided with reservoir heating means for maintaining the liquid metal reagent in a liquid state.

The metal reagent reservoir may be the first storage means referred to herein above.

Alkali metal hydroxides and alkaline earth metal hydroxides are known to be strongly corrosive. Therefore, all elements of the system that are in contact with these metal hydroxides must be made of and/or recovered with corrosion resistant materials.

The method of in situ hydrogen generation controlled on demand according to the invention, comprises reacting a metal reagent selected from alkali metals, alkaline earth metals, alkali metal alloys and blends comprising alkali metals, alkaline earth metal alloys and blends comprising alkaline earth metals, and metal alloys comprising at least one alkali metal and at least one alkaline earth metal, with water to obtain hydrogen and a residual reaction product comprising metal hydroxide selected from alkali hydroxides and alkaline earth hydroxide; and separating hydrogen from the residual reaction product. Particularly, the method includes the steps of:

liquefying the metal reagent by heating to obtain liquid metal reagent under vacuum conditions;

injecting the liquid metal reagent into a reactor by means of metal reagent injecting means and simultaneously injecting by means of a water injecting system a stoichiometric amount of demineralized water with respect to the amount of the liquid metal reagent being injected into the reactor such that a controlled metal reagent/water ratio is maintained in the reactor;

transferring hydrogen and the residual reaction product from the reactor to separating means;

separating hydrogen from the residual reaction product; transferring separated hydrogen to hydrogen receiving means and transferring the residual reaction product to metal hydroxide receiving means, whereby the metal reagent injecting means, the water injection system the reactor, the separating means and the hydrogen receiving means are kept free of oxygen by selectively providing a vacuum in the system.

The method may additionally comprise a process for recovering metal reagents selected from Li, Na, K, Mg or alloys thereof from the metal hydroxide present in the residual reaction product by reducing the metal hydroxide to in a metal hydroxide-reducing reactor with a reducing agent, comprising;

transferring the residual reaction product from the metal hydroxide receiving means to the metal hydroxide reducing reactor;

generating a vacuum in the metal hydroxide reducing reactor containing the residual reaction product;

subjecting the residual reaction product to thermal dehydration in the vacuum;

extracting evaporated water from the metal hydroxide reducing reactor so as to render the residual reaction product moisture free, and optionally recycling the evaporated water so as to use it in the hydrogen generation method;

calcinating the residual reaction product to convert the metal hydroxide into metal oxide;

reducing the metal oxide, under vacuum conditions, with the reducing agent comprising a mixture of finely divided dehydrated ferrosilicon and dehydrated calcium oxide by heating the metal oxide to a temperature above the boiling point of the metal reagent present in the metal oxide, thereby providing a silicothermic reduction of the metal oxide so that vaporized metal reagent is obtained;

extracting the vaporized metal reagent from the reducing reactor and transferring the vaporized metal reagent to a condenser;

liquefying the vaporized metal reagent in the condenser by cooling it down to a temperature above the melting point of the alkali metal, to obtain liquid metal reagent;

transferring the liquid metal reagent to a metal reagent reservoir.

The liquid metal reagent may be maintained in a liquid state in the metal reagent reservoir. The alkali metal contained in the metal reagent reservoir may be injected into said reactor by a metal reagent injecting device, or stored for later consumption in a solid state.

As apparent, according to the present invention, the recovery of metal reagent from the residual reaction product allows efficient recycling of the metal reagent from the metal hydroxide as present in the residual reaction product produced when hydrogen is generated. The recovery is based on the following reaction scheme that, although specifically referring to alkali metals, is also applicable to Mg by analogy:

(i) Thermal dehydration i.e. calcination of an alkali metal hydroxide at vacuum to obtain alkali metal oxide and water:

$$2MeOH \rightarrow Me_2O + H_2O$$

(ii) silicothermic reduction of the alkali metal oxide with calcium oxide and ferrosilicon at vacuum to obtain raw alkali metal, as well as calcium silicate and iron as byproducts:

$$2Me_2O + CaO + FeSi \rightarrow Fe + CaSiO_3 + 4Me_{(g)}$$

(iii) distillation and purification of the raw alkali metal to obtain pure alkali metal:

$$Me_{(g)} \rightarrow Me_{(l)}$$

Silicothermic reduction has as such been widely used in industry connection with magnesium metal production from magnesia by the Pidgeon process, where the presence of oxygen does not have negative influence, the Pidgeon process is as such not useful for obtaining alkali metals as the presence of ambient oxygen would re-oxidize the alkali metal or lead to the presence of water as a byproduct. Therefore, the silicothermic reduction according to the present invention is performed at vacuum so as to avoid the presence of ambient oxygen and after prior thermal dehydration to avoid any contact of water produced with the alkaline metal when produced. Therefore, the volume of the vacuum trap used must be sufficiently large to retain the whole water produced when the residual reaction product is dehydrated in the reduction reactor.

Whilst the silicothermic reduction is thermodynamically unfavorable, in accordance with Chatelier's Principle the equilibrium may be driven to the right by continuous supply of heat and withdrawing one of the reaction products. According to the invention, the reaction product withdrawn is the metal reactant which is withdrawn by distillation at a temperature that is higher than its boiling point. The temperature at which the boiling point is reached is lowered by the vacuum applied in accordance with the present invention, as shown by the following comparative table:

| Metal | Boiling point (° C. at 760 mmHg) | Vaporization heat (KJ/mol) | Boiling point (° C. at 20 mmHg) | Boiling point (° C. at 5 mmHg) |
|---|---|---|---|---|
| Lithium | 1,342 | 147.1 | 939 | 834 |
| Sodium | 883 | 96.96 | 574 | 496 |
| Potassium | 759 | 79.87 | 467 | 395 |
| Rubidium | 688 | 64 | 403 | 339 |
| Magnesium | 1,107 | 127.4 | 766 | 676 |
| Calcium | 1,484 | 153.6 | 1,031 | 914 |
| Barium | 1,140 | 140.3 | 809 | 721 |

Calcium oxide as added according to this invention has a double purpose namely, to react with the silica to form calcium silicate thereby withdrawing a product from the reaction, and to cede heat generated by the exothermic nature of the reaction thereby contributing to drive the reaction equilibrium to the right.

The estimated total amount of energy required for the metal reagent recovery ranges from a theoretical minimum of 6.7 MHw/ton of metal to 75 MHw/ton of metal, the majority of metals being comprised within the range of 25/55 MWh/ton. No greenhouse gases are produced.

As, contrarily to prior art, according to the present invention operates in an oxygen-free reaction environment is achieved by generating a vacuum, and not by creating an inert atmosphere of pressurized inert gas such like argon. No tank for containing such an inert gas is required.

Further, by adequately selecting the metal reagent or alloys thereof, the invention allows operating at low pressures including pressures below 2 bar, and within substantially lower temperature ranges, e.g. between −14° C. and 180° C. than known prior art systems. These conditions are advantageous inasmuch the system of the invention is to be designed to stand only relatively low temperatures and pressures and, moreover, it is a technical solution that allows controlling the per se violent reaction and thereby controllably producing hydrogen on demand without deflagrations. Furthermore, the invention needs only a small input of energy to start the reaction and leads to easily separable hydrogen, as hydrogen is the only gas produced in the reaction at ambient temperature. The system of the invention may be designed for hydrogen generation to fit in vehicles, apparatus requiring energy input, or in off-line stationary plants such as power plants.

The hydrogen generating system may be implemented in a motor vehicle or other system, alone or in combination with the recovery system.

Thus, in a service station, the metal reactant may be heated and pumped in a liquid state into the first storage means and/or directly into one or more cylinders of the metal reactant feeding system where it may be allowed to solidify. In this latter case, the head chambers of the cylinders may act as the first storage means. The first reagent heating means are in this case designed to heat and liquefy a portion of the metal reactant that is near the reactant outlet of the cylinder head. The liquefied portion is pushed by the piston through the outlet and thus fed into the reactor. The first heating means may thus be, for example, an electric resistance located to heat the front portion of the cylinders head chamber. Hydrogen as generated may be stored in a tank for consumption or directly used in the fuel cell, engine or turbine. When the system stops, the metal reactant is allowed to cool down and solidify.

When also the recovery system is implemented in the vehicle or other system or apparatus requiring energy input, the metal reactant as recovered may be used for hydrogen generation. In this case, the recovered metal reactant may be transferred into the first storage means i.e. into a separate deposit from where it is provided in a liquid state into the cylinder head, or directly into the head of a cylinder that is not being used for reactant injection at that moment. Also, the metal reagent reservoir may be the same element as the first storage means, or the metal reagent may be a separate tank that can be removed from the vehicle. In an embodiment of the recovery system, the reducing agent is preloaded in the hydroxide reducing reactor, for example as a tube-shaped briquette having an inner passage through which the evaporated metal reagent flows after dehydration and calcination of the metal hydroxide.

One advantage of the system of the present invention when implemented in a vehicle is that the weight of the system is rather constant inasmuch the metal hydroxide as produced has a very similar weight to that of the metal reagent. Thus, when the recovery system is not implemented in the vehicle, the weight of fresh metal reagent fed into the first storage means is practically equivalent to that of the metal hydroxide that is removed, whilst when the recovery system is also implemented in the vehicle, the weight of the recovered metal reactant is practically equivalent to the weight of the metal hydroxide produced.

As apparent from the above description, the present invention overcomes the drawbacks of prior art by means of a novel system and method.

BRIEF DESCRIPTION OF THE DRAWINGS

Hereinafter, aspects and embodiments of the invention will be described on the grounds of drawings wherein.

In these figures, there are references identifying the following elements

| | |
|---|---|
| 1 | first storage means |
| 2 | second storage means |
| 3 | reactor |
| 3a | first reactor inlet |
| 3b | second reactor inlet |
| 3c | reactor outlet |
| 4 | first separating means |
| 4a | inlet |
| 4b | first outlet |
| 4c | second outlet |
| 4d | suction port |
| 4e | inner chamber |
| 4f | baffles |
| 5 | hydrogen receiving means |
| 6 | metal hydroxide receiving means |
| 7 | metal reagent injecting device |
| 7a | cylinder barrel |
| 7b | head chamber |
| 7c | reagent outlet |
| 7d | reagent inlet |
| 7e | vacuum port |
| 7f | piston |
| 7g | metal reagent feeding pipe |
| 7i | metal reagent feeding valve |
| 7j | piston actuator |
| 8 | metal reagent injecting pipe |
| 9a | first reagent heating means |
| 9b | second reagent heating means |
| 10a | vacuum system |
| 10b | vacuum pipe |
| 10c | vacuum valve |
| 11 | pressure control valve |
| 12 | check valve |
| 13 | water injection pipe |
| 14 | water dosing means |
| 15 | water-injecting means |
| 16 | spraying nozzle |
| 17 | refrigerating means |
| 18 | second separating means |
| 18a | gas-vapor inlet |
| 18b | hydrogen outlet |
| 18c | metal hydroxide outlet |
| 19 | hydrogen filtering device |
| 20 | hydrogen pressure control valve |
| 21a | first extraction valve |
| 21b | second extraction valve |
| 22 | level gauge |
| 23 | start-up vacuum valve |
| 24 | hydroxide reducing reactor |
| 24a | reaction chamber |
| 24b | reducing agent inlet |
| 24c | residue inlet |
| 24d | reactor extraction outlet |
| 25 | reactor heating means |
| 26a | vacuum conduct |
| 26b | vacuum generating means |
| 26c | moisture extraction valve |
| 27 | vacuum trap |
| 27a | condensate outlet |
| 27b | venting outlet |
| 28 | condensate extracting valve |
| 29 | venting valve |
| 30 | moisture cooling means |
| 31 | extraction conduct |
| 32 | metal reagent reservoir |
| 32a | reservoir outlet |
| 33 | metal reagent cooling means |
| 34 | reservoir heating means |
| 35 | engine/fuel cell/turbine |
| 36 | secondary hydrogen separators |
| 37 | thermocouple |
| 38 | pressure sensor |
| 39 | hydrogen pressure sensor |
| 40 | reagent valve |
| 41 | metal outlet valve |
| 42 | tube-shaped reducing agent briquette |
| 42a | axial passage |
| 43 | metal hydroxide |
| C | first piston position |
| V | second piston position |

DETAILED DESCRIPTION

Figure 1:
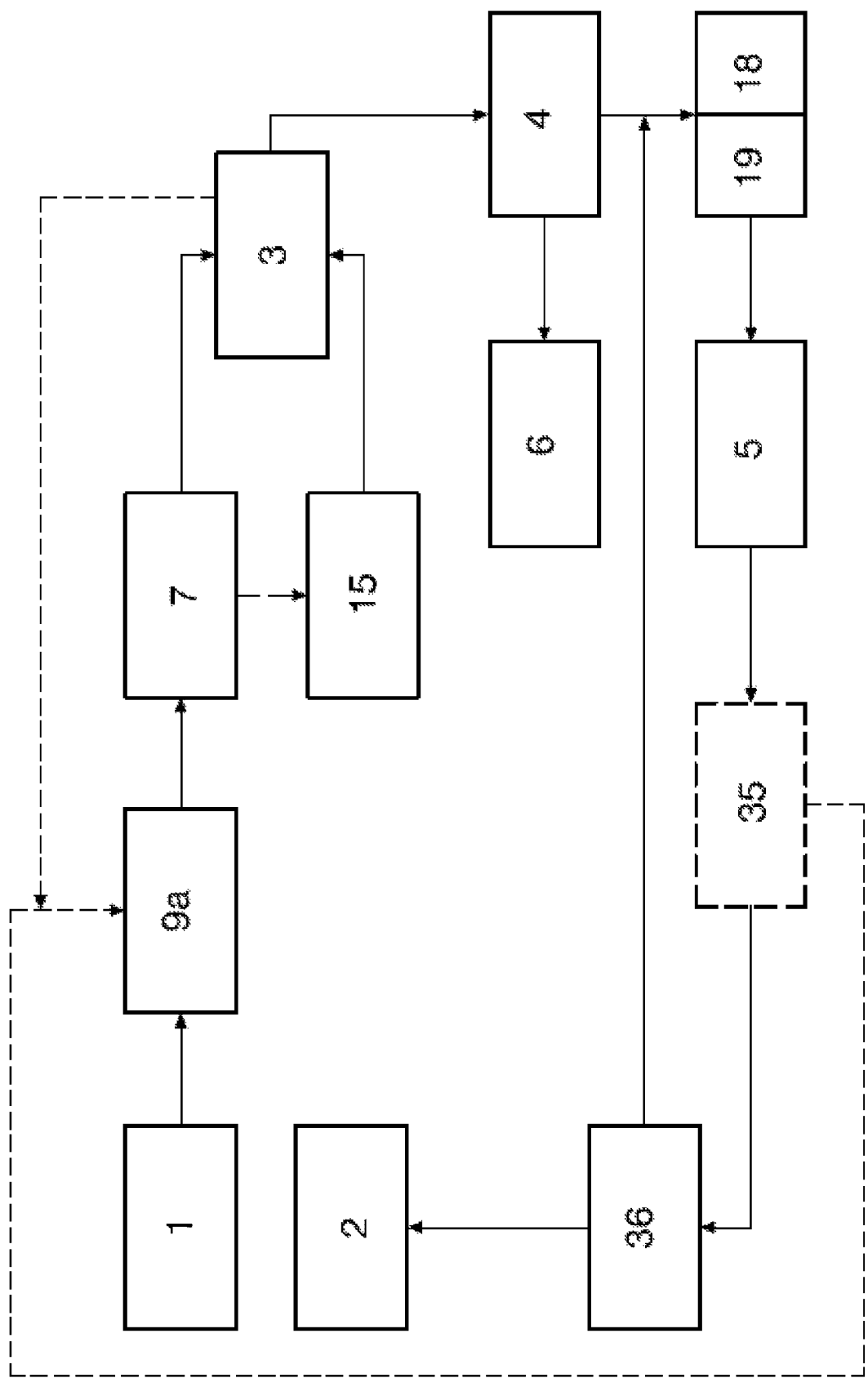
FIG. 1 is a flow diagram of an embodiment of the hydrogen generating process according to the invention.
Figure 2:
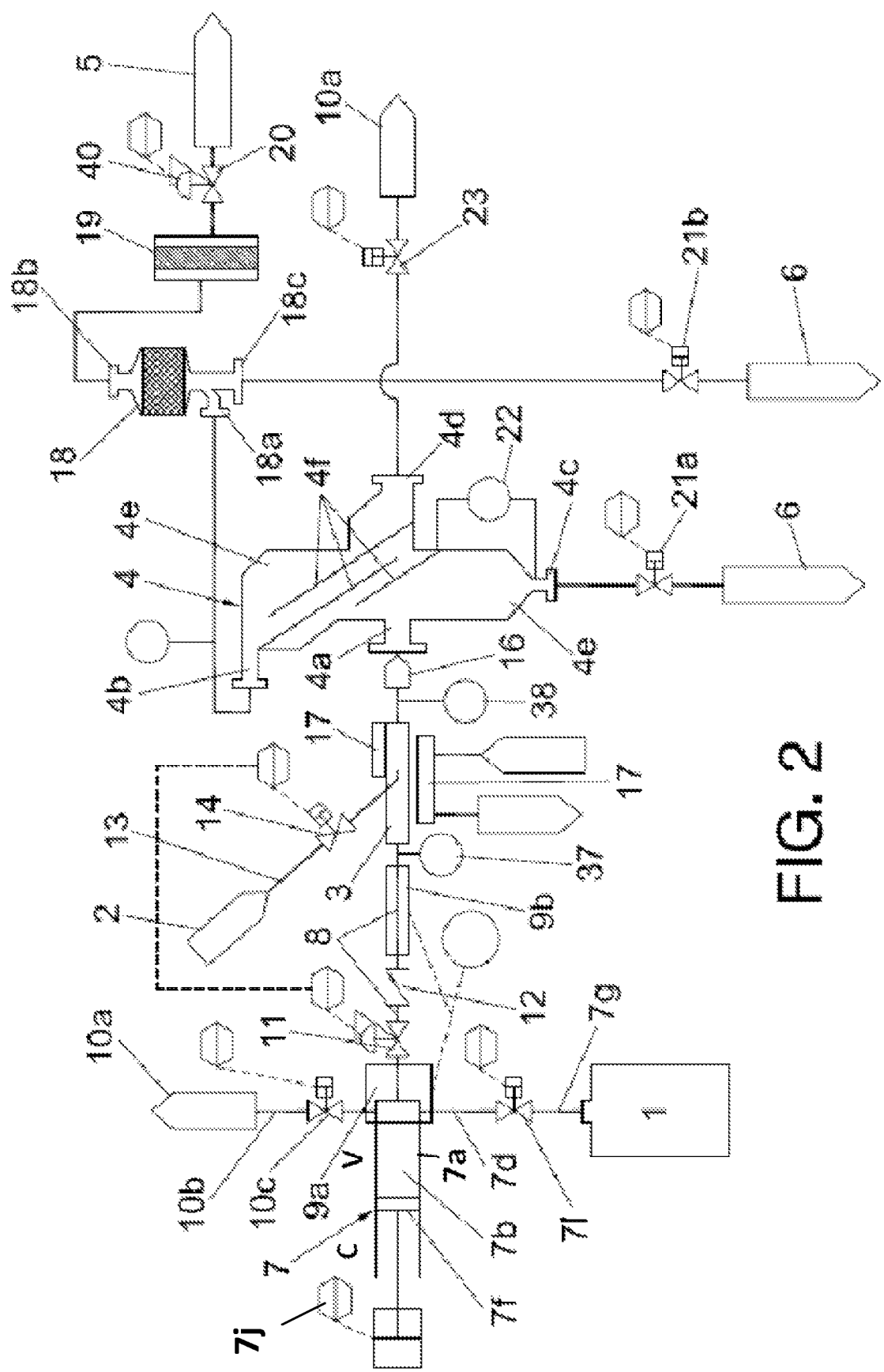
FIG. 2 shows an embodiment of a system for generating hydrogen in accordance with the process shown in FIG. 1.
Figure 3:
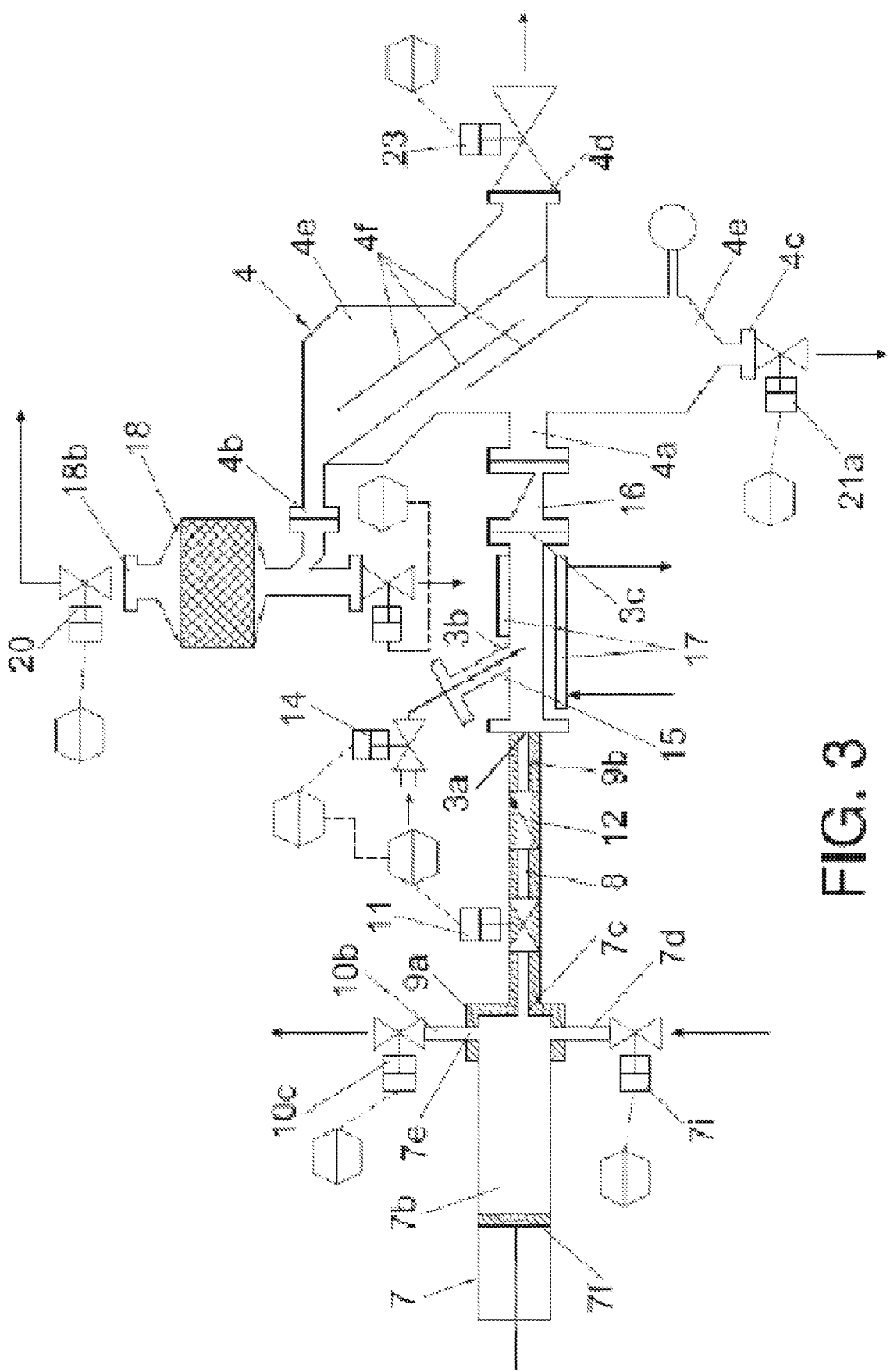
FIG. 3 is a more detailed view of the system shown in FIG. 2.

FIGS. 1 to 3 show the basic steps and elements of hydrogen generation in accordance with an embodiment of the invention.

The basic steps of this embodiment are shown in FIG. 1 and will be explained on the basis of an alkali metal such as lithium or sodium being used as the first reagent although these steps can also be followed analogously using alkaline earth metal, or alloys of these metals.

Alkali metal contained in the first storage means -1- is heated by first reagent heating means -9a- to a temperature above its melting point, and the so liquefied alkali metal is injected by extrusion, preferably using a controlled dimension extruder die head, into the reactor -3- by means of the metal reagent injecting device -7-. Simultaneously, demineralized cool liquid water coming from the second storage means -2- is also injected into the reactor -3- by water-injection means -15-. The water-injecting means -15- is controlled such that it provides a water flow that is at all times proportional to the flow of metal reagent injected. Thereby, the injected water flow is increased when the flow of metal reagent is increased in response to an increased hydrogen demand, and reduced when flow of metal reagent is reduced in response to a reduced hydrogen demand. The mixture of hydrogen gas and the residual reaction product comprising alkali metal hydroxide obtained in the reactor -3- are sprayed into first separation means -4- where hydrogen is separated from the residual reaction product. The residual reaction product is withdrawn from the first separating means -4- and transferred to the metal hydroxide receiving means -6- which may be, for example, a tank or a reduction reactor as the one that will be described herein below with reference to FIG. 4. The extracted hydrogen is made to pass a demister -18- to separate possibly still present alkali metal hydroxides or water, then through a hydrogen filtering device -19- and received by hydrogen receiving means -5- as, for example, a hydrogen storage tank, or a hydrogen deposit connected to an engine, fuel cell or turbine -35- or directly to the engine, fuel cell or turbine -35-. Vapors or water released from the engine -35- after hydrogen-based power generation are fed into a secondary hydrogen separator -36- where hydrogen remaining in the vapors is separated from water. The secondary hydrogen separator -36- is aimed to recover, essentially as a safety measure, hydrogen that has not reacted when energy is generated for example in fuel cells. The remaining hydrogen is re-circulated to the demister -18- and the water is fed into the second storage means -2-.

FIGS. 2 and 3 show the system used to perform the basic steps depicted in FIG. 1 in a more detailed manner. As apparent, the system as shown in FIGS. 2 and 3 comprises first storage means -1- for storing an alkali metal, such like sodium or lithium, and second storage means -2- for storing demineralized water, and a reactor -3- in which the alkali metal and water react to generate gaseous hydrogen. The reactor -3- is a homogenous reactor and comprises reagent inlets -3a, 3b- and a reactor outlet -3c-, separating means -4, 18- connected to the reactor outlet -3c- for separating the gaseous hydrogen from a residual reaction product comprising alkali metal hydroxide produced in the reactor -3-. Hydrogen receiving means -5- are connected to the first separating means -4- for receiving gaseous hydrogen extracted from the first separating means -4-.

The first storage means -1- are connected to a first reactor inlet -3a- through a metal reagent feeding system that comprises an alkali metal injecting device -7- for controllably injecting a flow of the metal reagent in a liquid state into the reactor -3-, an alkali metal injecting pipe -8- connecting the injection device -7- with the first reactor inlet -3a-, and metal reagent heating means -9a, 9b- for heating the metal reagent to a temperature above the metal reagent's melting point so as to bring the metal reagent into said liquid state before entering the reactor -3-. The reagent heating means -9a, 9b- comprise first reagent heating means -9a- arranged to heat at least a head chamber -7b- of the alkali metal injecting device -7-, as well as second reagent heating means -9b- arranged at an alkali metal injection pipe -8-.

The metal reagent feeding system further comprises vacuum generating means -10a, 10b, 10c- for selectively generating a vacuum in the first feeding system, flow control valve means -11, 12- for controlling the flow of the metal reagent into the reactor -3-, and refrigerating means -17- for maintaining the reactor -3- at a working temperature. The flow control valve means -11, 12- are inserted in the alkali metal injecting pipe -8- and comprise a pressure control valve -11- arranged between the reagent outlet -7c- and the first reactor inlet -3a-, and a check valve -12- arranged between the pressure control valve -11- and the first reactor inlet -3a- to avoid refluxes from the reactor -3-. The vacuum generating means -10a, 10b, 10c- also comprises a vacuum system -10a- connected to the vacuum port -7d- through a vacuum pipe -10b-, and a vacuum valve -10c- inserted in the vacuum pipe -10b-.

The second storage means -2- are connected to a second reactor inlet -3b- through a water feeding system comprising a water injection pipe -13- connecting the second storage means -2- to the second reactor inlet -3b-, water dosing means -14- for dosing the water to be injected into the reactor -3- and water injecting means -15- connected to the second reactor inlet -3b-.

The flow control valve means -11- and the water dosing means -14- are valves controlled by ratio control means such that the water dosing means -14- at all times provide a stoichiometric amount of water with respect to the amount of the metal reagent being injected into the reactor -3- such that a controlled metal reagent/water ratio is maintained in the reactor -3-. The flow control valve -11- and the water dosing valve -14- are thus in a M/S—'Master/Slave-relationship where the flow control valve -11- is the master and the water dosing valve -14- is the slave.

The alkali metal injecting device -7- comprises a cylinder barrel -7a-, and the above mentioned head chamber -7b- for housing liquid metal reagent and a reagent outlet -7c- connected to the alkali metal injecting pipe -8-. A reagent inlet -7d- is connected to the first storage means -1- by means of a reagent feeding pipe -7g-, and a reagent feeding valve -7i- connected between the reagent inlet -7d- and the first storage means -1-. The alkali metal injecting device further comprise a vacuum port -7e- connected to the vacuum generating means -10a, 10b, 10c-, and a piston -7f- movable within the cylinder barrel -7a- towards a first position -C- whereby alkali metal is sucked into the head chamber -7b- through the reagent inlet -7e- and to a second position -V- whereby the flow of liquid alkali metal is expelled from the head chamber -7b- through the reagent outlet -7c- into the alkali metal injecting pipe -8-.

The separating means -4, 18- comprises first separating means -4- connected to the reactor outlet -3c- and comprising an inlet -4a- connected to the reactor outlet -3c- for receiving a mixture of hydrogen and the residual reaction product as generated in the reactor, a first outlet -4b- connected to the hydrogen receiving means -5-, and a second outlet -4c- connected to metal hydroxide receiving means -6- provided to receive residual reaction product extracted from the first separating means -4-. In the embodiment shown in FIGS. 2 and 3, the first separating means -4- comprise a static separator with an inner chamber -4e- with inclined baffles -4f- arranged to provide a labyrinth path between inlet -4a- and the first outlet -4b-, to allow light hydrogen gas to pass to the upper portion of the inner chamber -4a- and to retain alkali metal hydroxide in the lower portion of the inner chamber -4a-. The first separating means -4- further comprises a suction port -4d- connected to the vacuum system -10a-, and a start-up vacuum valve -23- interconnected between the suction port -4d- and the vacuum system -10a- so that, when the hydrogen generation is started, the whole system is under vacuum conditions. After hydrogen generation has started, the generated hydrogen progressively builds up pressure in the system so that a hydrogen atmosphere is produced from the reactor to the hydrogen receiving means -5- and, where applicable the engine, fuel cells or turbine. In case of emergency, hydrogen being present in the hydrogen generating system may be evacuated by the vacuum system. The reactor outlet -3c- is connected to a spraying nozzle -16- for spraying said mixture into the first separating means -4-.

The system further comprises second separating means -18- interconnected between the hydrogen receiving means -5- and the first outlet -4b- of the first separating means -4-, the second separating means -18- being a droplet separator comprising a gas vapor inlet -18a- connected to the first outlet of the first separating means -4-, a hydrogen outlet -18b- connected to the hydrogen receiving means -5-, and a metal hydroxide outlet -18c- connected to the metal hydroxide receiving means -6-. A hydrogen filtering device is interconnected between the droplet separator -19- and the hydrogen receiving means -5-.

Hydrogen generation with the system described with reference to FIGS. 1-3 may be carried out as follows.

When the piston -7f- of the metal injection device -7- is in its first position -V-, the vacuum valve -10c- is opened whilst the reagent feeding valve -7i- and the pressure control valve -11- are closed, such that vacuum is generated in head chamber -7b-, in the reagent inlet -7d-, in the reagent outlet -7c-, in the vacuum pipe -10b- and in the portion of the metal reagent injection pipe -8- comprised between the reactor outlet -7c- and pressure control valve -11-. At that stage, the hydrogen pressure control valve -20-, the first extraction valve -21a- and the second extraction valve -21b- are closed, and a vacuum is also generated in the reactor -3-, the first separating means -4-, the droplet separator -18-, the hydrogen filtering device -19- and in the conducts and pipes connecting these elements, by opening the start-up vacuum valve -23-. Vacuum is generated by vacuum system -10a-.

Once the vacuum has been generated in the system, vacuum valve -10c- closes, the reagent feeding valve -7i- opens and piston -7f- is moved backwards towards its second position -C- such that fused, liquid alkali metal is sucked from the first storage means -1- through reagent feeding pipe -7g- and reagent inlet -7d- into head chamber -7b-. At the same time, the heating means -9a, 9b- respectively heat the head chamber -7b- and the metal reagent injection pipe -8- to maintain the liquid condition of the alkali metal before it enters the reactor -3-. Temperature is controlled by thermocouple -37-.

By moving the piston -7f- towards its first position -C-, a controlled flow of liquid alkali metal is pressed through metal reagent injecting pipe -8- and injected through the first reactor inlet -3a- into the reactor -3-. The flow of liquid alkali is controlled by pressure control valve -11-, and backflows from the reactor -3- are prevented by check valve -12-. Simultaneously, a controlled amount of demineralized water from the second storage means -2- is injected by action of an injection pump (not shown in the drawings) through the water injection pipe -13- and the second reactor inlet -3b- into the reactor -3-. The amount of water injected is dosed by the water dosing means -14- i.e. a dosing valve, such that the amount of water injected is always stoichiometric with respect to the flow of liquid alkali metal that is being injected. For this purpose, the pressure control valve -11- and the dosing valve -12- are controlled in the above describe M/S loop. By simultaneously injecting the alkali metal and water, a homogeneous reaction mixture is formed. The length of the reactor -3- i.e. of the time the reactants remain in the reactor -3- for a given level of hydrogen generation depends on the metal reactant or alloy used.

The reaction is practically instantaneous or at least very fast, and the pressure generated in the reactor by the reaction is controlled by a pressure sensor -38- such that, when the pressure in the reactor -3- exceeds a predetermined limit, as for example in the case of obstruction of the spaying nozzle -16-, the supply of liquid alkali metal and water is stopped. Hydrogen and metal hydroxide still remaining in the reactor -3- may be removed by flushing the reactor -3- with water. Excess heat produced in the reactor -3- by the exothermic reaction of the liquid alkali metal with water is removed by refrigerating means -17- as, for example, a circuit with a cooling fluid such as water that can be connected to other elements of the system, such as the first and/or second metal reagent heating means -9a, 9b- to transmit thermal energy thereto.

The mixture of hydrogen and vaporized alkali metal hydroxide leaves the reactor -3- through the reactor outlet -3c- and is vigorously sprayed by the spraying nozzle -16- through the inlet -4a- into the static separator -4-. Hydrogen gas is collected in the top portion of the inner chamber -4e- of the static separator whilst the vaporized alkali metal cools down and thus acquires a liquid state and therefore mostly accumulates in the bottom portion of said inner chamber -4a- from where it is transferred to the metal receiving means -6- by opening the second extraction valve -21b- when a level gauge -22- has detected that the level of the accumulated alkali metal hydroxide exceeds a predetermined limit. In operation of the hydrogen generating system, a certain predetermined hydraulic level of alkali metal hydroxide is maintained in the bottom portion of the inner chamber -4e- to prevent the pressurized hydrogen present in the inner chamber -4e- to escape when alkali metal hydroxide is withdrawn.

Hydrogen and possibly still existing vaporized alkali metal existing collected in the top portion are transferred through the first outlet -4b- through a gas-vapor inlet -18a- into the droplet separator -18- where the still existing vaporized alkali metal is liquefied thus separated from hydrogen and transferred to the metal hydroxide receiving means -6- by opening the second extraction valve -21b-.

Hydrogen separated in the droplet separator -18- is extracted therefrom, and conducted through the hydrogen filtering means -19- to the hydrogen receiving means -5- by opening the hydrogen pressure valve -20- which controls the hydrogen flow under the control of a hydrogen pressure sensor -39-.

Figure 4:
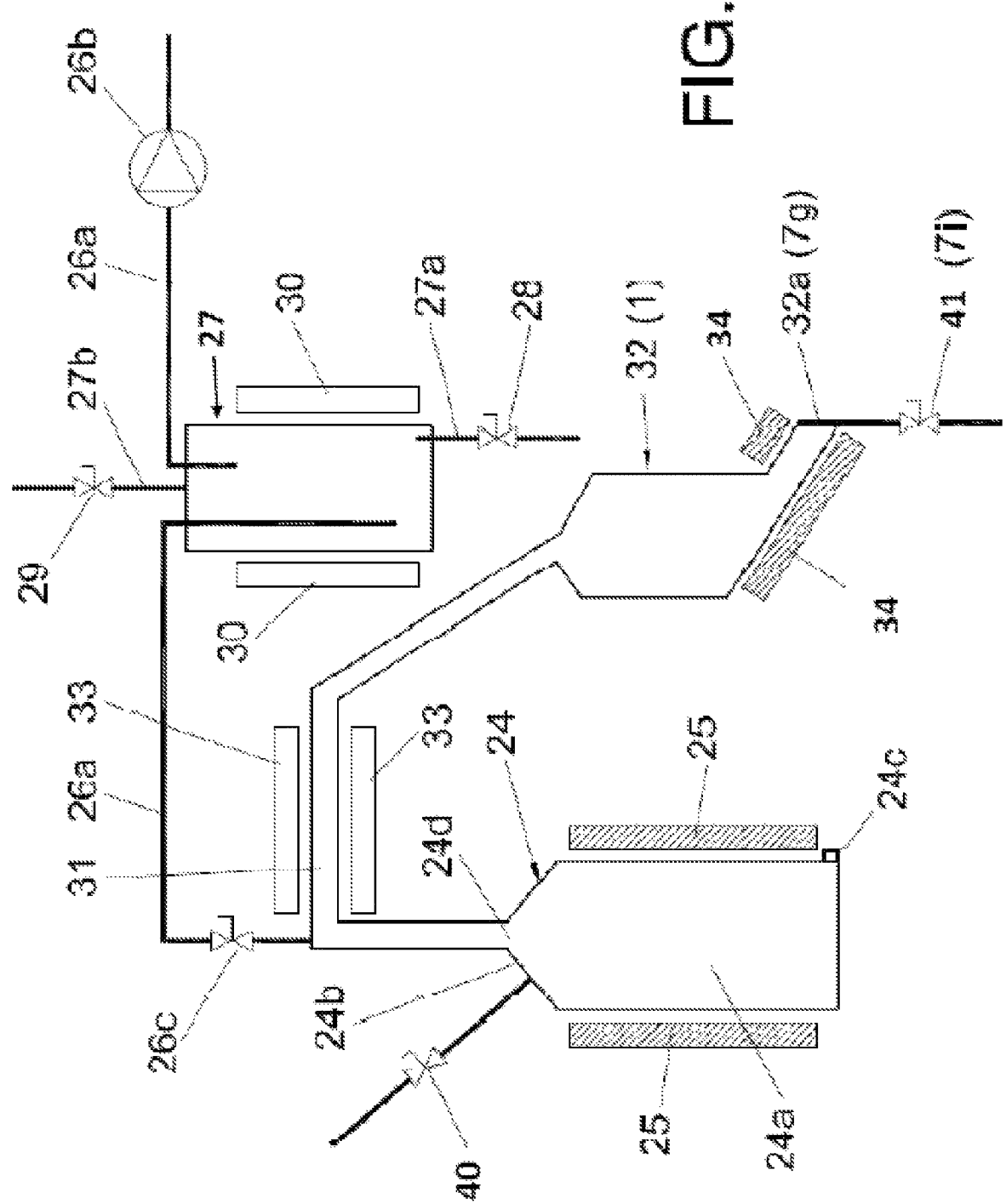
FIG. 4 shows an embodiment of a system for recovering metal reagent from metal hydroxide by thermodistillation in accordance with an embodiment of the invention.

FIG. 4 shows an embodiment of a recovery system for recovering metal alkali from the residual reaction product. The recovery system comprises a metal hydroxide reducing reactor -24- comprising a reaction chamber -24a- with a reducing agent inlet -24b- for feeding a reducing agent comprising a mixture of finely divided ferrosilicon and calcium oxide into the reaction chamber -24a-, a residue inlet -24c- for feeding residual reaction product comprising at least one alkali metal hydroxide into the reaction chamber -24a-, a reactor extraction outlet -24d- for selectively extracting moisture and vaporized alkali metal from the reaction chamber -24a-.

The reducing reactor -24- is provided with reactor heating means -25- for selectively heating the reaction chamber -24a- to a dehydrating temperature to extract moisture from the residual reaction product, to a calcination temperature to convert dehydrated alkali metal hydroxide into alkali metal oxide, and to a vaporization temperature that is higher than the boiling point of the alkali metal present in the residual reaction product so as to obtain the vaporized alkali metal.

A vacuum trap -27- is interconnected in a vacuum conduct -26a- between the extraction outlet -24d- and the vacuum generating means -26b-. The vacuum trap -27- comprises a condensate outlet -27a- located its bottom portion and connected to a condensate extraction valve -28- and a venting outlet -27b- located at its top portion and connected to a venting valve -29-. A moisture extraction valve -26c- is interconnected in the vacuum conduct -26a- between the extraction outlet -24a- and the vacuum trap -27-, and moisture cooling means -30- are provided for cooling moisture present in the vacuum trap -24- down to a moisture condensation temperature. An extraction conduct -31- is connected to the reactor extraction outlet -24d- and to an alkali metal reservoir -32-.

Alkali metal cooling means -33- are arranged at the extraction conduct -31- for liquefying the vaporized alkali metal entering the extraction conduct -31- by cooling it down to a temperature above the melting point of the alkali metal, so that liquid alkali metal is delivered into the alkali metal reservoir -32-. The alkali metal reservoir -32- is provided with reservoir heating means -34- for maintaining the liquid alkali material in a liquid state. The alkali metal reservoir may be the first storage means -1- referred to herein in respect of FIGS. 1-3.

Alkali metal recovery with the recovery system according to the embodiment shown in FIG. 4 is performed in the following manner:

The residual alkali hydroxide is placed in the reaction chamber -24a- of the hydroxide reducing reactor -24-. With the condensate valve -28-, the venting valve -29- and the reagent feeding valve -7i- remaining closed, the moisture extraction valve -26c- is opened such that by action of the vacuum pump -26b- a vacuum may be created in the recovery system. The temperature in the reactor -24- is then increased by action of reactor heating means -25- above 100° C. so as to completely distill any moisture such as crystallization waters or absorbed moisture from the alkali metal hydroxide. Moisture thus evaporates through the reactor extraction outlet -24d- and is conducted through the vacuum conduct -26a- to the vacuum trap -27- and condensed therein by action of the moisture cooling means -30-, so that liquid water accumulates at the bottom portion of the vacuum trap -27-. The liquid water can be extracted by breaking the vacuum by opening venting valve -29- and the opening the condensate extraction valve -28- so that the water may flow through the condensate outlet -27a-. The volume of the vacuum trap -27- must be sufficient to house the whole moisture distilled from the alkali metal hydroxide placed in the hydroxide reducing reactor -24-.

Once dehydration has been completed, the dehydrated alkali metal hydroxide is then calcined to alkali metal oxide. A homogenous mixture of dehydrated and finely divided ferrosilicon and calcium oxide is introduced into the reactor -24- by opening the reagent valve -40- an that the mixture may flow through the reactor's reducing agent inlet -24b- into the reaction chamber -24a-. Once a predetermined vacuum has been reached in the reaction chamber -24a-, the moisture extraction valve -26c- and the vacuum pump -26b- is stopped. The temperature in the reaction chamber -24a'- is then increased by the reactor heating means -25- to a temperature above the boiling point of the alkali metal comprised in the alkali metal oxide at the vacuum working pressure existing in the reactor chamber -24a-, whereby this alkali metal vaporizes through the reactor extraction outlet -24d- into the extraction conduct -31-, where the extracted alkali metal is cooled down by alkali metal cooling means -30- to a temperature slightly above the alkali metal's melting point thereby causing the vaporized alkali metal to condense until becoming liquid. The liquid alkali metal drops into the alkali metal reservoir -32- and accumulates in the bottom portion thereof, where it is maintained in its liquid condition by reservoir heating means -34-, and from where it can be extracted through the reservoir outlet -32a- by opening the metal outlet valve -41-.

As shown in FIG. 4 by the reference numerals placed in brackets, the alkali metal reservoir -32- may be the first storage means -1-, such that the reservoir outlet -32a- and the metal outlet valve -41- operate respectively as the reactor feeding pipe -7g- and the reagent feeding valve -7i referred to herein above with reference to FIGS. 2 and 3, so that metal recovering system shown in FIG. 4 is integrated into the hydrogen generating system shown in FIGS. 1-3.

Figure 5:
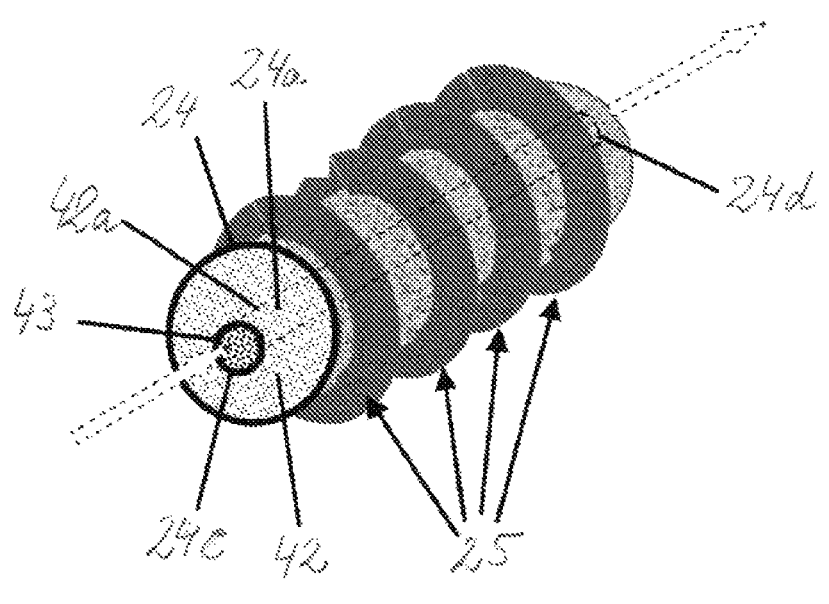
FIG. 5 shows an alternative embodiment of the reducing reactor for the system shown in FIG. 4.

In the alternative embodiment of the reducing reactor -24- shown in FIG. 5, the reducing agent is preloaded in the hydroxide reducing reactor -24- as a tube-shaped briquette -42- made of a homogenous mixture of ferrosilicon and calcium oxide. The briquette -42- has an axial passage -42a- connecting the residue inlet -24c- with the reactor extraction outlet -24d-. The alkali metal hydroxide is filled into the axial passage -42a-. Dehydration and calcination are performed in the axial passage -42a- as described herein above with reference to FIG. 4. The alkali metal oxide obtained after calcination is then heated so that the silicothermic reduction takes place and the vaporized metal reactant is obtained. As the alkali metal oxide is in contact with the surface of the of the axial passage -42a-, the alkali metal oxide reacts with the ferrosilicon and calcium oxide and is converted into alkali metal that is extracted through the reactor extraction outlet -24d- in a vaporized state. The axial passage -42a- thus acts as the reaction chamber -35- which is heated by the reactor heating means -25-. The subsequent processing of the moisture obtained by the dehydration and calcination and of the vaporized alkali metal, is analogous to what has been described herein above with reference to FIG. 4.

After completion of the silicothermic reduction, the resulting byproducts. Fe and $CaSiO_3$ can be removed from the axial passage -42a- by "flushing" the axial passage with a controlled stream of compressed air.

The invention claimed is:

1. A hydrogen generating system for controlled on demand in situ hydrogen generation comprising:
   first storage means storing a first reagent;
   second storage means for storing demineralized water as a second reagent;
   a reactor in which the reagents are made to react to generate gaseous hydrogen, the reactor comprising reagent inlets and a reactor outlet, injecting means for controllably injecting a flow of the first reagent heated above its melting point into the reactor;
   a water injection system for injecting the demineralized water into the reactor;
   separating means connected to the reactor outlet for separating the gaseous hydrogen from a residual reaction product, as produced in the reactor; and
   hydrogen receiving means connected to the first separating means for receiving gaseous hydrogen extracted from the first separating means;
   wherein the first reagent is a pure aluminum-free metal reagent comprising at least one of alkali metals, alkaline earth metals, alkali metal alloys and alkali metal blends comprising alkali metals, alkaline earth metal alloys and alkaline earth metal blends comprising alkaline earth metals, and metal alloys and blends comprising at least one alkali metal and at least one alkaline earth metal, and the residual reaction product comprises metal hydroxide selected from alkali metal hydroxides and alkaline earth metal hydroxides;

wherein the injecting means are metal reagent injecting means for controllably injecting a flow of the metal reagent in a liquid state into the reactor by extrusion;
wherein the water injection system is for injecting at all times a stoichiometric amount of water, cool and in liquid state, with respect to the amount of the metal reagent being injected into the reactor such that a controlled metal reagent/water ratio is maintained in the reactor;
wherein the reactor is a homogenous reactor; and
the system further comprising means for keeping the storage means, the metal reagent injecting means, the water injection system, the reactor, the separating means and the hydrogen receiving means free of oxygen by selectively providing a vacuum in the system.

2. A hydrogen generating system according to claim 1, wherein
the first storage means are connected to a first reactor inlet through a metal reagent feeding system comprising
at least one metal injecting device for controllably injecting the flow of the metal reagent in a liquid state into the reactor by extrusion through a controlled dimension orifice extruder die head,
a metal reagent injecting pipe connecting the injection device with the first reactor inlet;
reagent heating means for heating the metal reagent to said temperature above the metal reagent's melting point so as to bring the metal reagent into said liquid state before entering the reactor;
vacuum generating means for selectively generating a vacuum in the first feeding system, the storage means, the water injection system, the reactor, the separating means and the hydrogen receiving means free of oxygen;
flow control valve means for controlling the flow of the metal reagent into the reactor;
refrigerating means for maintaining the reactor at a working temperature;
the second storage means are connected to a second reactor inlet through a water-feeding system comprising a water injection pipe connecting the second storage means to the second reactor inlet, water dosing means for dosing the water to be injected into the reactor and water-injecting means connected to the second reactor inlet;
the flow control valve means and the water dosing means are controlled by ratio control means such that the water dosing means at all times provide said stoichiometric amount of water to maintain said controlled metal reagent/water ratio in the reactor.

3. A hydrogen generating system according to claim 2, wherein
the metal injecting device comprises
a cylinder barrel,
a head chamber for housing liquid metal reagent and comprising a reagent outlet connected to the metal injecting pipe, a reagent inlet connected to the first storage means by means of a metal reagent feeding pipe, and a metal reagent feeding valve connected between the reagent inlet and the first storage means;
a vacuum port connected to the vacuum generating means;
a piston movable within the cylinder barrel towards a first position whereby metal reagent is sucked into the head chamber through the reagent inlet and towards a second position whereby the flow of metal reagent is expelled from the head chamber through the reagent outlet into the metal reagent injecting pipe,
a piston actuator for controlling the movement of the piston between said first position and said second position so as to exert controlled pressure on the liquid metal reagent present within the cylinder barrel.

4. A hydrogen generating system according to claim 2, wherein the flow control valve means are inserted in the metal reagent injecting pipe and comprise
a pressure control valve arranged between the reagent outlet and the first reactor inlet;
a check valve arranged between the pressure control valve and the first reactor inlet to avoid refluxes from the reactor.

5. A hydrogen generating system according to claim 2, wherein the vacuum generating means comprise a vacuum system connected to the vacuum port through a vacuum pipe, and a vacuum valve inserted in the vacuum pipe.

6. A hydrogen generating system according to claim 3, wherein the reagent heating means comprise first reagent heating means arranged to heat at least the head chamber of the metal reagent injecting device.

7. A hydrogen generating system according to claim 3, wherein the reagent heating means comprise second reagent heating means arranged at the metal reagent injecting pipe.

8. A hydrogen generating system according to claim 1, wherein the separating means comprise first separating means connected to the reactor outlet and comprising an inlet connected to the reactor outlet for receiving a mixture of hydrogen and the residual reaction product as generated in the reactor, a first outlet connected to the hydrogen receiving means, and a second outlet connected to metal hydroxide receiving means provided to receive residual reaction product extracted from the first separating means.

9. A hydrogen generating system according to claim 8, wherein the reactor outlet is connected to a spraying nozzle to spray said mixture into the first separating means.

10. A hydrogen generating system according to claim 8, wherein the first separating means comprise a suction port connected to the vacuum system, and a start-up vacuum valve interconnected between the suction port and the vacuum system.

11. A hydrogen generating system according to claim 8, wherein it comprises second separating means interconnected between the hydrogen receiving means and the first outlet of the first separating means, the second separating means being a demister comprising a gas-vapor inlet connected to the first outlet of the first separating means, a hydrogen outlet connected to the hydrogen receiving means, and a metal hydroxide outlet connected to the metal hydroxide receiving means.

12. A hydrogen generating system according to claim 11, wherein it comprises a hydrogen filtering device interconnected between the droplet separator and the hydrogen receiving means.

13. A hydrogen generating system according to claim 2, wherein the refrigerating means of the reactor are thermally connected to the first and/or second reactive heating means by means of a circuit with a cooling fluid, so that heat generated in the reactor is used to heat the metal reagent before it is injected into the reactor.

14. A hydrogen generating system according to claim 1, further comprising:
a metal-hydroxide reducing reactor comprising a reaction chamber, a residue inlet for feeding residual reaction product comprising at least one alkali metal hydroxide into the reaction chamber so as to bring the residual reaction product into contact with a reducing agent comprising ferrosilicon and calcium oxide, a reactor extraction outlet for selectively extracting moisture and vaporized alkali metal from the reaction chamber;

reactor heating means for selectively heating the reaction chamber to a dehydrating temperature to extract moisture from the residual reaction product, to a calcination temperature to convert dehydrated metal hydroxide into metal oxide, and to a vaporization temperature that is higher than the boiling point of the alkali metal present in the residual reaction product so as to obtain the vaporized alkali metal;

a vacuum conduct connected to the extraction outlet and to vacuum generating means;

a vacuum trap interconnected in the vacuum conduct between the extraction outlet and the vacuum generating means, the vacuum trap comprising a condensate outlet located at its bottom portion and connected to a condensate extraction valve and a venting outlet located at its top portion and connected to a venting valve;

a moisture extraction valve interconnected in the vacuum conduct between the extraction outlet and the vacuum trap;

moisture cooling means for cooling moisture present in the vacuum trap down to a moisture condensation temperature;

an extraction conduct connected to the reactor extraction outlet and to an alkali metal reservoir;

alkali metal cooling means arranged at the extraction conduct for liquefying the vaporized alkali metal entering the extraction conduct by cooling it down to a temperature above the melting point of the alkali metal, so that liquid alkali metal is delivered into the alkali metal reservoir.

15. A hydrogen generating system according to claim 14, wherein the alkali metal reservoir is provided with reservoir heating means for maintaining the liquid alkali material in a liquid state.

16. A hydrogen generating system according to claim 14, wherein the alkali metal reservoir is said first storage means.

17. A hydrogen generating system according to claim 14, wherein the metal hydroxide reducing reactor comprises a reducing agent inlet for feeding a mixture of finely divided ferrosilicon and calcium oxide into the reaction chamber.

18. A hydrogen generating system according to claim 2, wherein the refrigerating means of the reactor are thermally connected to the hydroxide reducing reactor by means of a circuit with a cooling fluid, so that heat generated in the reactor is used to heat the metal hydroxide reducing reactor.

19. A method of in situ hydrogen generation controlled on demand comprising:

reacting an aluminum-free metal reagent comprising at least one of alkali metals, alkaline earth metals, alkali metal alloys and alkali metal blends comprising alkali metals, alkaline earth metal alloys and alkaline metal blends comprising alkaline earth metals and metal alloys and blends comprising at least one alkali metal and at least one alkaline earth metal, with water to obtain hydrogen and a residual reaction product comprising metal hydroxide selected from alkali hydroxides and alkaline earth hydroxide; and separating hydrogen from the residual reaction product; wherein the method comprises:

liquefying the metal reagent by heating to obtain liquid metal reagent under vacuum conditions;

injecting the liquid metal reagent into a homogeneous reactor by extrusion, by means of metal reagent injecting means and simultaneously injecting by means of a water injection system a stoichiometric amount of water with respect to the amount of the liquid metal reagent being injected into the reactor such that a controlled metal reagent/water ratio is maintained in the reactor;

transferring hydrogen and the residual reaction product from the reactor to separating means;

separating hydrogen from the residual reaction product;

transferring separated hydrogen to hydrogen receiving means and transferring the residual reaction product to metal hydroxide receiving means, whereby the metal reagent injecting means, the water injection system, the reactor, the separating means and the hydrogen receiving means are kept free of oxygen by selectively providing a vacuum in the system.

20. A method according to claim 19, wherein that alkali metal is recovered from the alkali metal hydroxide present in the residual reaction product by reducing the alkali metal hydroxide to in a metal hydroxide-reducing reactor with a plurality of reducing agents, by means of a process comprising;

transferring the residual reaction product from the metal hydroxide receiving means to the metal hydroxide reducing reactor;

generating a vacuum in the hydroxide-reducing reactor containing the residual reaction product;

subjecting the residual reaction product to thermal dehydration in the vacuum;

extracting evaporated water from the hydroxide-reducing reactor so as to render the residual reaction product moisture free;

calcinating the residual reaction product to convert the metal hydroxide into metal oxide;

reducing the metal oxide, under vacuum conditions, with the reducing agent comprising a mixture of finely divided dehydrated ferrosilicon and dehydrated calcium oxide by heating the metal oxide in the reactor to a temperature above the boiling point of the metal reagent present in the metal oxide, thereby providing a silicothermic reduction of the metal oxide by which vaporized metal reagent is obtained;

extracting the vaporized alkali metal from the hydroxide-reducing reactor and transferring the vaporized alkali metal to a condenser;

liquefying the vaporized alkali metal in the condenser by cooling it down to a temperature above the melting point of the alkali metal, to obtain liquid alkali metal;

transferring the liquid alkali metal to an alkali metal reservoir.

21. A method according to claim 20, wherein liquid alkali material is maintained in a liquid state in the alkali metal reservoir.

22. A method according to claim 20, wherein the alkali metal contained in the alkali metal reservoir is injected into said reactor by a metal reagent injecting device.

* * * * *